United States Patent
Payton

(10) Patent No.: US 11,394,727 B2
(45) Date of Patent: *Jul. 19, 2022

(54) SYSTEM AND METHOD FOR SIDE-CHANNEL BASED DETECTION OF CYBER-ATTACK

(71) Applicant: HRL Laboratories, LLC, Malibu, CA (US)

(72) Inventor: David W. Payton, Calabasas, CA (US)

(73) Assignee: HRL LABORATORIES, LLC, Malibu, CA (US)

(*) Notice: Subject to any disclaimer, the term of this patent is extended or adjusted under 35 U.S.C. 154(b) by 715 days.

This patent is subject to a terminal disclaimer.

(21) Appl. No.: 16/219,749

(22) Filed: Dec. 13, 2018

(65) Prior Publication Data

US 2019/0253439 A1    Aug. 15, 2019

Related U.S. Application Data

(60) Provisional application No. 62/684,181, filed on Jun. 12, 2018, provisional application No. 62/630,675, filed on Feb. 14, 2018.

(51) Int. Cl.
*G06F 21/56* (2013.01)
*H04L 29/06* (2006.01)
(Continued)

(52) U.S. Cl.
CPC ........ *H04L 63/1416* (2013.01); *G06F 21/755* (2017.08); *G06F 21/85* (2013.01);
(Continued)

(58) Field of Classification Search
CPC ... H04L 63/14; H04L 12/40; H04L 29/06877; G06F 21/55; G06F 21/755
See application file for complete search history.

(56) References Cited

U.S. PATENT DOCUMENTS

2008/0276111 A1   11/2008   Jacoby et al.
2014/0115405 A1   4/2014   Condorelli et al.
(Continued)

FOREIGN PATENT DOCUMENTS

| CN | 103488727 B | 5/2017 |
|---|---|---|
| WO | WO2009094413 | 7/2009 |
| WO | WO2016085861 | 6/2016 |

OTHER PUBLICATIONS

Kocher, Paul, Joshua Jaffe, Benjamin Jun, and Pankaj Rohatgi. Introduction to differential power analysis. Journal of Cryptographic Engineering, 1(1): pp. 5-27, 2011.
(Continued)

*Primary Examiner* — Izunna Okeke
(74) *Attorney, Agent, or Firm* — Tope-McKay & Associates

(57) ABSTRACT

Described is a system for side-channel based detection of cyber-attack. In operation, the system converts data bus signals from a platform (e.g., vehicular platform) into a first time series of system states. The system further converts analog side-channel signals from the platform into a second time-series of system states. Anomalous behavior of the platform is detected by comparing the first time series of system states with the second time series of system states to identify violations of predetermined constraints. Upon detection, the anomalous behavior is designated as a cyber-attack of the platform, which causes the platform to initiate an action based on the detected cyber-attack. Such actions include implementing a safe made, etc.

24 Claims, 11 Drawing Sheets

(51) Int. Cl.
| | |
|---|---|
| H04L 9/40 | (2022.01) |
| H04L 12/40 | (2006.01) |
| G06F 21/85 | (2013.01) |
| H04L 69/08 | (2022.01) |
| G06F 21/75 | (2013.01) |
| H04L 67/12 | (2022.01) |

(52) U.S. Cl.
CPC .......... *H04L 12/40* (2013.01); *H04L 63/1425* (2013.01); *H04L 63/1441* (2013.01); *H04L 69/08* (2013.01); *H04L 67/12* (2013.01); *H04L 2012/40215* (2013.01)

(56) References Cited

U.S. PATENT DOCUMENTS

| | | | |
|---|---|---|---|
| 2015/0271201 A1 | | 9/2015 | Ruvio et al. |
| 2016/0342791 A1* | | 11/2016 | Aguayo Gonzalez ...................... G01R 31/2887 |
| 2017/0270295 A1 | | 9/2017 | Park et al. |
| 2018/0012020 A1 | | 1/2018 | Prvulovic et al. |
| 2018/0012030 A1 | | 1/2018 | Litichever et al. |
| 2018/0262527 A1* | | 9/2018 | Jain ..................... H04L 63/1475 |

OTHER PUBLICATIONS

Carlos R. Aguayo Gonzalez and Jeffrey H. Reed. Power fingerprinting in SDR & CR integrity assessment. In IEEE Military Communications Conference (MILCOM), pp. 1-7, 2009.

Shane S. Clark, Benjamin Ransford, Amir Rahmati, Shane Guineau, Jacob Sorber, Kevin Fu, and Wenyuan Xu. WattsUpDoc: Power side channels to nonintrusively discover untargeted malware on embedded medical devices. In Proceedings of the 2013 USENIX Conference on Safety, Security, Privacy and Interoperability of Health Information Technologies, HealthTech, pp. 1-11, 2013.
Notification of Transmittal of International Search Report and the Written Opinion of the International Searching Authority for PCT/US2018/065558; dated Apr. 9, 2019.
International Search Report of the International Searching Authority for PCT/US2018/065558; dated Apr. 9, 2019.
Written Opinion of the International Searching Authority for PCT/US2018/065558; dated Apr. 9, 2019.
Notification of the International Preliminary Report on Patentability Chapter I for PCT/US2018/065558; dated Aug. 27, 2020.
The International Preliminary Report on Patentability Chapter I for PCT/US2018/065558; dated Aug. 27, 2020.
Notification of Transmittal of International Search Report and the Written Opinion of the International Searching Authority for PCT/US2019/038576; dated Oct. 11, 2019.
International Search Report of the International Searching Authority for PCT/US2019/038576; dated Oct. 11, 2019.
Written Opinion of the International Searching Authority for PCT/US2019/038576; dated Oct. 11, 2019.
Notification of the International Preliminary Report on Patentability Chapter I for PCT/US2019/038576; dated Mar. 11, 2021.
The International Preliminary Report on Patentability Chapter I for PCT/US2019/038576; dated Mar. 11, 2021.
Communication pursuant to Rules 70(2) and 70a(2) EPC (the supplementary European search report) for the European Regional Phase Patent Application No. 18906281.3, dated Oct. 19, 2021.

* cited by examiner states from time series 308 ↓

| | DG | DS | UN | DG | DG | RG | DG | DG | DS | DG | DG | DG | DG | DG | P | DG | DG | DG | DG | UN |
|---|---|---|---|---|---|---|---|---|---|---|---|---|---|---|---|---|---|---|---|---|
| Park | 0 | 0 | 2 | 0 | 0 | 0 | 0 | 0 | 0 | 1 | 0 | 0 | 0 | 0 | 262 | 0 | 0 | 0 | 0 | 0 |
| Reverse/Go | 0 | 1 | 0 | 0 | 0 | 110 | 0 | 0 | 0 | 0 | 0 | 0 | 0 | 0 | 3 | 0 | 0 | 0 | 0 | 12 |
| Drive/Stop | 0 | 1195 | 0 | 0 | 0 | 1 | 19 | 54 | 706 | 0 | 1 | 0 | 1 | 0 | 7 | 0 | 0 | 0 | 0 | 0 |
| Drive/Go | 43 | 82 | 1 | 174 | 211 | 14 | 129 | 139 | 46 | 41 | 245 | 142 | 53 | 63 | 4 | 266 | 30 | 276 | 531 | 23 |
| (Cluster #) | 1 | 2 | 3 | 4 | 5 | 6 | 7 | 8 | 9 | 10 | 11 | 12 | 13 | 14 | 15 | 16 | 17 | 18 | 19 | 20 |

↳ states from time series 312

| | DG | DS | UN | DG | DG | RG | DG | DG | DS | DG | DG | DG | DG | DG | P | DG | DG | DG | DG | UN |
|---|---|---|---|---|---|---|---|---|---|---|---|---|---|---|---|---|---|---|---|---|
| Park | 1 | 39 | 0 | 0 | 0 | 0 | 1 | 0 | 0 | 0 | 0 | 105 | 0 | 2 | 40 | 0 | 0 | 0 | 1 | 0 |
| Reverse/Go | 0 | 0 | 0 | 0 | 0 | 0 | 0 | 138 | 0 | 0 | 0 | 1 | 0 | 7 | 0 | 0 | 0 | 0 | 17 | 0 |
| Drive/Stop | 0 | 0 | 0 | 0 | 0 | 0 | 0 | 1 | 0 | 1 | 0 | 1 | 27 | 0 | 0 | 0 | 0 | 0 | 0 | 0 |
| Drive/Go | 165 | 3 | 32 | 65 | 221 | 103 | 120 | 55 | 48 | 76 | 1 | 169 | 0 | 60 | 7 | 58 | 52 | 206 | 0 | 47 |
| (Cluster #) | 21 | 22 | 23 | 24 | 25 | 26 | 27 | 28 | 29 | 30 | 31 | 32 | 33 | 34 | 35 | 36 | 37 | 38 | 39 | 40 |

↳ states from time series 312

FIG. 10

SYSTEM AND METHOD FOR SIDE-CHANNEL BASED DETECTION OF CYBER-ATTACK

GOVERNMENT RIGHTS

This invention was made with government support under U.S. Government Contract Number D15PC00223, "Side-Channel Causal Analysis for Design of Cyber-Physical Security". The government has certain rights in the invention.

CROSS-REFERENCE TO RELATED APPLICATIONS

This application is a non-provisional patent application of U.S. Provisional Application No. 62/630,675, filed on Feb. 14, 2018, the entirety of which is hereby incorporated by reference.

This application is ALSO a non-provisional patent application of U.S. Provisional Application No. 62/684,181, filed on Jun. 12, 2018, the entirety of which is hereby incorporated by reference.

BACKGROUND OF INVENTION

(1) Field of Invention

The present invention relates to intrusion detection and, more specifically, to a system for side-channel based detection of cyber-attack.

(2) Description of Related Art

Cyber-attack is a problem that plagues many industries and is accomplished through a variety of techniques. For example, many known attacks on automobiles involve some form of spoofing or altering CAN bus messages. A Controller Area Network (CAN) bus is a robust vehicle bus standard designed to allow microcontrollers and devices to communicate with each other in applications without a host computer. Such CAN bus attacks may occur either remotely through vehicle wireless interfaces or they may occur through illicit access to vehicle hardware interfaces. In either case, once the attacker gains control of one vehicle subsystem, they can proceed to wreak havoc with other vehicle subsystems by gaining access to the CAN bus. For instance, if an attacker can use the CAN bus to cause another module to go into diagnostic mode, they can stop that module's messages from appearing on the bus, and then they can replace those messages with their own. Depending on the module, these spoof messages can potentially put passengers in serious danger by disabling brakes or triggering automated features such as parking assist at inappropriate moments. In this invention, we make use of side-channel information to provide a means to detect such attacks.

The most common use of side-channel information is to enable an attacker to uncover a hidden encryption key in order to break into a system (see the List of Incorporated Literature References, Literature Reference No. 1). Typically, these methods involve correlating side-channel emissions of a cryptographic device with various alternative inputs such that these variations can reveal the hidden key one bit at a time. In practical use, the attacker must have access to a side-channel measurement of the device hardware, such as power consumption, RF emissions, or acoustic emissions. The variations in these emissions, although very noisy, can be indicative of different bit strings being processed in the hardware, and therefore can reveal hidden information. A disadvantage of these methods is that they generally require averaging samples over a very large number of repeated trials in order to recover needed state information.

Others have made use of side-channel information as a means of checking software integrity in a computing system. In the work of Gonzalez et al, a cross-correlation method is used to compare processor side-channel power signatures to side-channel traces obtained from repeated runs (see Literature Reference No. 2). Signatures are obtained by hand-selecting specific sections of a captured power trace corresponding to a particular segment of code execution. In some cases, selected sections of a trace are obtained from multiple runs, aligned, and then averaged together to create a signature. In the work of Gonzalez et al., they need to capture signatures of malware as well as normal software to distinguish the differences.

In the work of Clark et al, a set of statistical features of side-channel signals are first extracted before being processed by a classifier (see Literature Reference No. 3). The classifier is then trained to distinguish between normal and abnormal behavior. A disadvantage of both the work of Gonzalez et al. and Clark et al. is that they require multiple pre-existing examples of normal and abnormal behavior in order to perform their detection of intrusions.

Thus, a continuing need exists for a system for cyber-attack detection that is designed to work within the context of a multi-module system where these modules communicate over a data bus, and which is capable of detecting anomalies without prior examples of anomalous behavior to train on.

SUMMARY OF INVENTION

This disclosure provides a system for side-channel based detection of cyber-attack. The system can be an embedded system having one or more processors and a memory. In various aspects, the memory is a non-transitory computer-readable medium having executable instructions encoded thereon, such that upon execution of the instructions, the one or more processors perform several operations. For example, in operation, the system converts data bus signals from a platform (e.g., vehicular platform) into a first time series of system states. The system further converts analog side-channel signals from the platform into a second time-series of system states. Anomalous behavior of the platform is detected by comparing the first time series of system states with the second time series of system states to identify violations of predetermined constraints. Upon detection, the anomalous behavior is designated as a cyber-attack of the platform, which causes the platform to initiate an action based on the detected cyber-attack. Such actions include implementing a safe mode, etc.

In another aspect, the platform is a vehicle and upon detecting a cyber-attack, the vehicle performs one or more actions selected from a group that includes deactivating internet network connections and switching the vehicle into a safe mode to disable one or more vehicular functions.

In yet another aspect, the data bus is a vehicle CAN bus.

Further, anomalous behavior is detected by identifying: violations of predetermined constraints, sets of disallowed combinations of side-channel states and data bus states, and co-occurrences of disallowed combinations appearing simultaneously and repeatedly within the first time series of system states and the second time series of system states.

In yet another aspect, in identifying violations of predetermined constraints, allowable state transitions between data bus states and corresponding side-channel states are designated as predetermined constraints, such that observations of violations of the predetermined constraints in the first time series of system states and the second time series of system states is classified as a cyber-attack of the platform.

Further, converting data bus signals from a platform into a first time series of system states further comprises operations of maintaining a k-state memory with the values of state variables transmitted by messages over the data bus such that all values in the memory represent the most recently received values over the data bus; and outputting at periodic intervals all of the k-state variables in the k-state memory as the first time series of system states.

In yet another aspect, converting analog side-channel signals from the platform into a second time-series of system states further comprises operations of capturing an analog side-channel signal; converting the analog signal into a digital representation; normalizing and convolving the digital representation of the analog signal with at least one stored template representing expected patterns for different system states; selecting a best matching template for the digital representation; and outputting at periodic intervals an identification of the best matching template.

In another aspect, capturing an analog side-channel signal is performed by amplifying a voltage measured across a sub-component fuse.

In yet another aspect, capturing an analog side-channel signal is performed by using a radio-frequency receiver.

Finally, the present invention also includes a computer program product and a computer implemented method. The computer program product can be implemented as a vehicle embedded system that includes computer-readable instructions stored on a non-transitory computer-readable medium that are executable by a computer having one or more processors, such that upon execution of the instructions, the one or more processors perform the operations listed herein. Alternatively, the computer implemented method includes an act of causing a computer to execute such instructions and perform the resulting operations.

BRIEF DESCRIPTION OF THE DRAWINGS

The objects, features and advantages of the present invention will be apparent from the following detailed descriptions of the various aspects of the invention in conjunction with reference to the following drawings, where:

FIG. 10 is a table depicting side-channel states.

DETAILED DESCRIPTION

Figure 1:
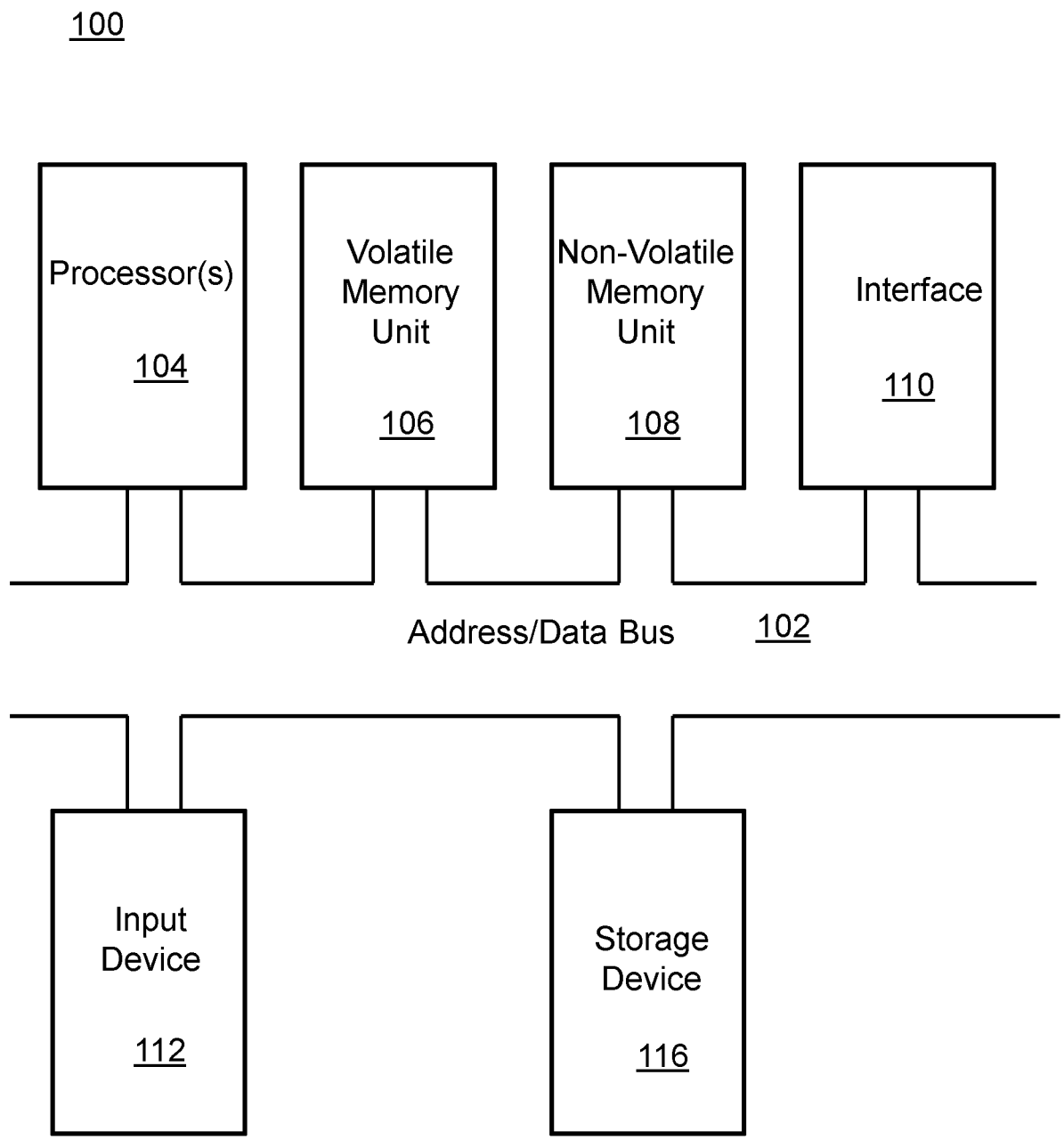
FIG. 1 is a block diagram depicting the components of a system according to various embodiments of the present invention.

The present invention relates to intrusion detection and, more specifically, to a system for side-channel based detection of cyber-attack. The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of aspects. Thus, the present invention is not intended to be limited to the aspects presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Before describing the invention in detail, first a list of cited references is provided. Next, a description of the various principal aspects of the present invention is provided. Subsequently, an introduction provides the reader with a general understanding of the present invention. Finally, specific details of various embodiment of the present invention are provided to give an understanding of the specific aspects.

(1) List of Incorporated Literature References

The following references are cited throughout this application. For clarity and convenience, the references are listed herein as a central resource for the reader. The following references are hereby incorporated by reference as though fully set forth herein. The references are cited in the application by referring to the corresponding literature reference number, as follows:

1. Kocher, Paul, Joshua Jaffe, Benjamin Jun, and Pankaj Rohatgi. Introduction to differential power analysis. *Journal of Cryptographic Engineering*, 1(1):5-27, 2011.
2. Carlos R. Aguayo Gonzalez and Jeffrey H. Reed. Power fingerprinting in SDR & CR integrity assessment. In IEEE Military Communications Conference (MIL-COM), 2009.
3. Shane S. Clark, Benjamin Ransford, Amir Rahmati, Shane Guineau, Jacob Sorber, Kevin Fu, and Wenyuan Xu. WattsUpDoc: Power side channels to nonintrusively discover untargeted malware on embedded medical devices. In *Proceedings of the* 2013 *USENIX Conference on Safety, Security, Privacy and Interoperability of Health Information Technologies*, HealthTech, 2013.

(2) Principal Aspects

Various embodiments of the invention include three "principal" aspects. The first is a system for side-channel based detection of cyber-attack. The system is typically in the form of a computer system operating software or in the form of a "hard-coded" instruction set any other hardware or components as may be necessary to implement the system described herein, including a processor, amplifier and A/D converter to digitize the analog side-channel signals. This system may be incorporated into a wide variety of devices that provide different functionalities. The second principal aspect is a method, typically in the form of software, operated using a data processing system (computer). The third principal aspect is a computer program product. The computer program product generally represents computer-readable instructions stored on a non-transitory computer-readable medium such as an optical storage device, e.g., a compact disc (CD) or digital versatile disc (DVD), or a magnetic storage device such as a floppy disk or magnetic tape. Other, non-limiting examples of computer-readable media include hard disks, read-only memory (ROM), and flash-type memories. These aspects will be described in more detail below.

A block diagram depicting an example of a system (i.e., computer system 100) of the present invention is provided in FIG. 1. The computer system 100 is configured to perform calculations, processes, operations, and/or functions associated with a program or algorithm. In one aspect, certain processes and steps discussed herein are realized as a series of instructions (e.g., software program) that reside within computer readable memory units and are executed by one or more processors of the computer system 100. When executed, the instructions cause the computer system 100 to perform specific actions and exhibit specific behavior, such as described herein.

The computer system 100 may include an address/data bus 102 that is configured to communicate information. Additionally, one or more data processing units, such as a processor 104 (or processors), are coupled with the address/data bus 102. The processor 104 is configured to process information and instructions. In an aspect, the processor 104 is a microprocessor. Alternatively, the processor 104 may be a different type of processor such as a parallel processor, application-specific integrated circuit (ASIC), programmable logic array (PLA), complex programmable logic device (CPLD), or a field programmable gate array (FPGA).

The computer system 100 is configured to utilize one or more data storage units. The computer system 100 may include a volatile memory unit 106 (e.g., random access memory ("RAM"), static RAM, dynamic RAM, etc.) coupled with the address/data bus 102, wherein a volatile memory unit 106 is configured to store information and instructions for the processor 104. The computer system 100 further may include a non-volatile memory unit 108 (e.g., read-only memory ("ROM"), programmable ROM ("PROM"), erasable programmable ROM ("EPROM"), electrically erasable programmable ROM "EEPROM"), flash memory, etc.) coupled with the address/data bus 102, wherein the non-volatile memory unit 108 is configured to store static information and instructions for the processor 104. In an aspect, the computer system 100 also may include one or more interfaces, such as an interface 110, coupled with the address/data bus 102. The one or more interfaces are configured to enable the computer system 100 to interface with other electronic devices and computer systems. The communication interfaces implemented by one or more interfaces that may include a CAN bus, wireline (e.g., serial cables, modems, network adaptors, etc.) and/or wireless (e.g., wireless modems, wireless network adaptors, etc.) communication technology. The interface 110 can, for example, be an output interface to a driver warning system or another vehicle controller that responds to an intrusion alert.

In one aspect, the computer system 100 may include an input device 112 coupled with the address/data bus 102. In various aspects, the input device 112 can be an amplifier and A/D converter to digitize the analog side-channels.

In an aspect, the computer system 100 further may include one or more optional computer usable data storage devices, such as a storage device 116, coupled with the address/data bus 102. The storage device 116 is configured to store information and/or computer executable instructions. In one aspect, the storage device 116 is a storage device such as a magnetic or optical disk drive (e.g., hard disk drive ("HDD"), floppy diskette, compact disk read only memory ("CD-ROM"), digital versatile disk ("DVD")).

The computer system 100 presented herein is an example computing environment in accordance with an aspect. However, the non-limiting example of the computer system 100 is not strictly limited to being a computer system. For example, an aspect provides that the computer system 100 represents a type of data processing analysis that may be used in accordance with various aspects described herein. Moreover, other computing systems may also be implemented. Indeed, the spirit and scope of the present technology is not limited to any single data processing environment. Thus, in an aspect, one or more operations of various aspects of the present technology are controlled or implemented using computer-executable instructions, such as program modules, being executed by a computer. In one implementation, such program modules include routines, programs, objects, components and/or data structures that are configured to perform particular tasks or implement particular abstract data types. In addition, an aspect provides that one or more aspects of the present technology are implemented by utilizing one or more distributed computing environments, such as where tasks are performed by remote processing devices that are linked through communicating control modules on the vehicle.

Figure 2:
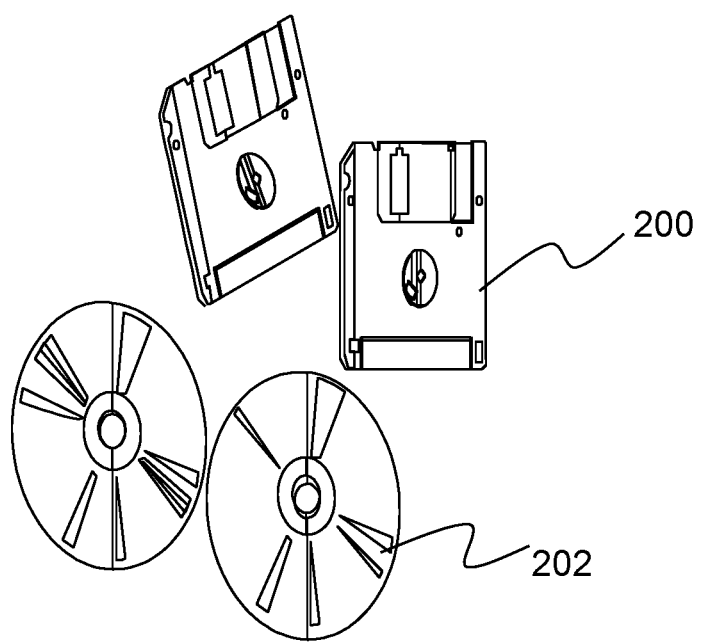
FIG. 2 is an illustration of a computer program product embodying an aspect of the present invention.

An illustrative diagram of a computer program product (i.e., storage device) embodying the present invention is depicted in FIG. 2. The computer program product is depicted as floppy disk 200 or an optical disk 202 such as a CD or DVD. However, as mentioned previously, the computer program product generally represents computer-readable instructions stored on any compatible non-transitory computer-readable medium. The term "instructions" as used with respect to this invention generally indicates a set of operations to be performed on a computer, and may represent pieces of a whole program or individual, separable, software modules. Non-limiting examples of "instruction" include computer program code (source or object code) and "hard-coded" electronics (i.e. computer operations coded into a computer chip). The "instruction" is stored on any non-transitory computer-readable medium, such as in the memory of a computer or on a floppy disk, a CD-ROM, and a flash drive. In either event, the instructions are encoded on a non-transitory computer-readable medium.

(3) Introduction

This disclosure provides a system and method to defend a networked platform (e.g., vehicle, etc.) from cyber-attacks by helping to detect the presence of an attacker. While the term networked may be used, it does not necessarily mean that the platform is connected to outside devices as well. Instead, the platform is networked in the sense that there are at least two modules communicating state information between one another over a data bus. On a vehicular platform, this is handled by the CAN bus. In particular, the system detects any attempt to spoof messages over the vehicle's data bus or CAN bus by virtue of using secondary information about vehicle activity derived from sources known as side-channels. It is well known that side-channels, such as power consumption or RF emissions, can be used to conduct cyber-attacks involving decryption of secret keys. The method of the present disclosure provides a means to use component power consumption, RF emissions, or similar side-channel signals, to defend against attacks by reliably identifying vehicle sub-system states. The system operates by comparing states detected from side-channels to states communicated over the vehicle's data bus and, thereby, identifies the presence of spoofing attacks and allows for corrective actions.

Figure 3A:
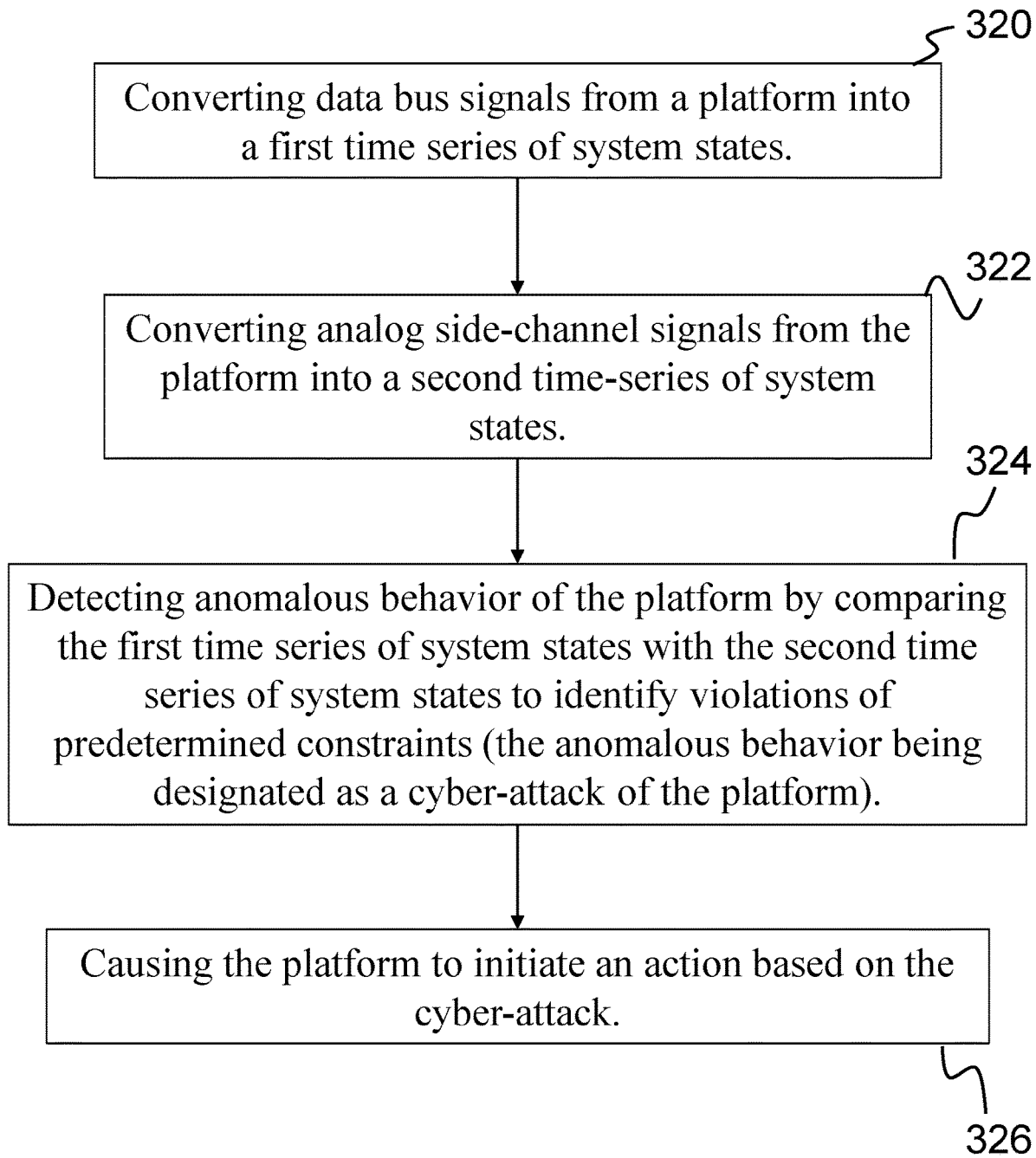
FIG. 3A is a flowchart illustrating a process for side-channel based detection of cyber-attack according to various embodiments of the present invention.

The process is depicted in FIG. 3A. During operation, the system converts 320 data bus signals from a platform into a first time series of system states. The system proceeds by converting 322 analog side-channel signals from the platform into a second time-series of system states. Thereafter, the system is operable for detecting 324 anomalous behavior of the platform by comparing the first time series of system states with the second time series of system states to identify violations of predetermined constraints (the anomalous behavior being designated as a cyber-attack of the platform). Upon detection, the system proceeds in causing 326 the platform to initiate an action based on the cyber-attack. Thus, the system is operable for preventing or mitigating issues caused by spoofing attacks.

Many known attacks on automobiles involve some form of spoofing or altering CAN bus messages. For instance, if an attacker can cause another module to go into diagnostic mode, they can stop that module's messages from appearing on the bus and then they can replace those messages with their own. Depending on the module, these spoof messages can potentially put passengers in serious danger. The system of the present disclosure defends against attacks like this by looking at the relationship between CAN bus messages and side-channel signals to find inconsistencies. It is hypothesized that any attempt to spoof messages on the bus will cause the appearance of discrepancies between bus messages and side-channel states. If the system of the present disclosure can detect such discrepancies, then the system can potentially detect a wide range of different attacks. Because this method can detect inconsistencies between two signals that ordinarily should be consistent, it provides a reliable indicator of novel cyber-attacks for which there may be no pre-existing examples to train on.

As can be appreciated by those skilled in the art, there are a variety of applications in which the system of the present disclosure can be implemented and applied to provide for cyber security. As a non-limiting example, the system can be used to address the problem of cyber intrusion detection for vehicles, and in particular automobiles. The growing media attention to hacked cars has made it very clear that many commercial automobiles are potentially vulnerable to life-threatening cyber-attacks. This invention addresses the problem of detecting the presence of such attacks before they can cause serious harm. However, while the analysis described in this disclosure is focused on comparison of side-channel data to CAN bus data, which is particular to automobiles, there are similar data busses in other vehicles such as aircraft to which these same analysis techniques could apply. Given these similarities, the potential application of this invention could range anywhere from providing a cyber intrusion monitor for automobiles all the way to cyber intrusion monitoring for commercial aircraft or other platforms, such as autonomous vehicles, drones, robots, satellites, etc. Thus, while the term vehicle is used for illustrative purpose throughout this disclosure, the invention is not intended to be limited thereto. Specific details are provided below.

(4) Specific Details of Various Embodiments

As noted above, the present disclosure provides a system and method to defend a vehicle from cyber-attacks by helping to detect the presence of an attacker. The system is designed to detect an attacker's attempt to spoof messages over the vehicle's data bus by virtue of using secondary information about vehicle activity derived from side-channel sources. This invention provides a method to classify side-channel signals into identifiable vehicle states and then to correlate those states with states identified in messages transmitted over the vehicle's data bus known as the Controller Area Network (CAN) bus. Once reliable correspondences between side-channel states and CAN bus states are established, any deviation from these correspondences is used to signal an alert that a potential cyber-attack is occurring.

Figure 3B:
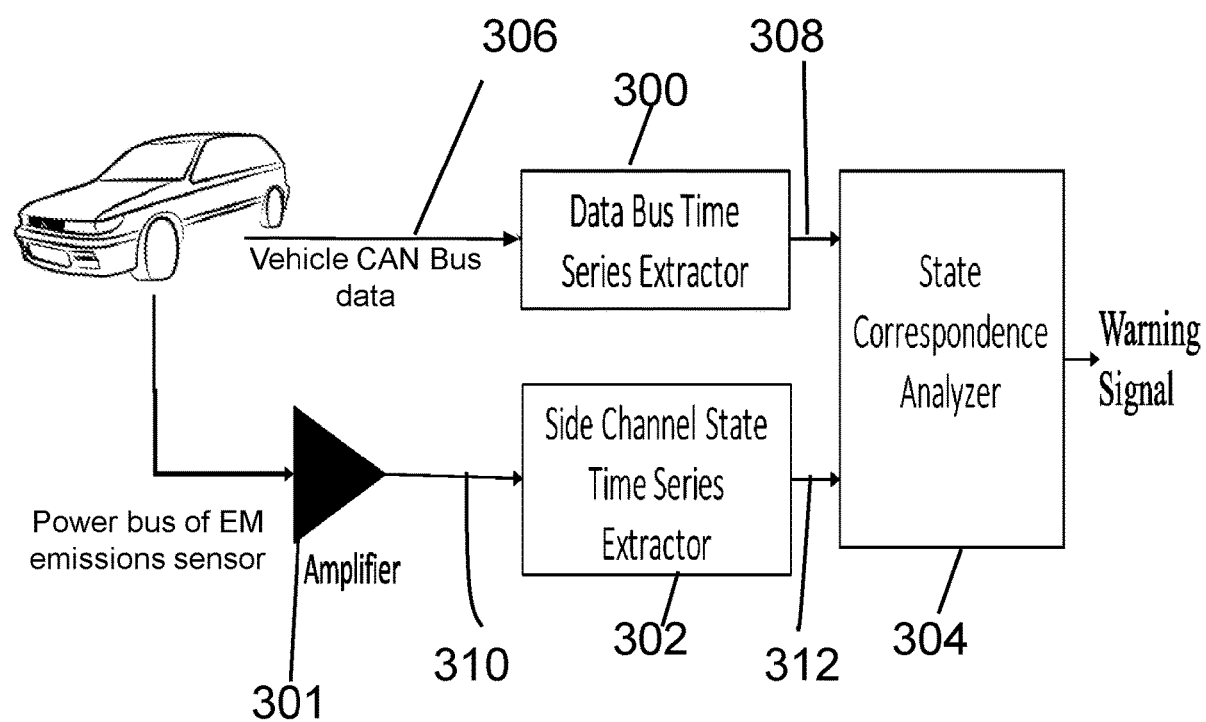
FIG. 3B is an illustration depicting system components according to various embodiments of the present invention, in which the system provides am ability to detect mismatch between vehicle states identified from data communications between system modules and states identified from sub-system side-channels.

As shown in FIG. 3B, the system includes three main components, a Data Bus Time Series Extractor 300, a Side Channel State Time Series Extractor 302, and a State Correspondence Analyzer 304. The Data Bus Time Series Extractor 300 monitors status messages 306 over the data bus and converts these status messages into a time series of system states 308. The second module, the Side Channel State Time Series Extractor 302 receives analog side-channel signals 310 as input from an amplifier 301 and converts them into a time-series of system states 312. These two modules 300 and 302 then provide their time-series outputs 308 and 312 to the State Correspondence Analyzer module 304.

It should be noted that there is a need for a sensing unit to capture the analog signals. In the case of RF side-channels from a vehicle control module, for example, the sensing unit could be a radio receiver tuned to frequencies related to processor clock frequencies such that changes in processor load can be detected. In one non-limiting example, the system can measure power consumed by using the existing fuse along with an op-amp as a current measuring device. While the system of the present disclosure is independent of the specific sensing unit, the sensing unit is an important input source to the system.

The State Correspondence Analyzer module 304 uses prior known relationships between the CAN bus states and the side-channel states to identify inconsistencies between the observed states in the two independently derived time series 308 and 312. Whenever a statistically significant deviation from known relationships is detected, an output warning signal is produced. This warning signal can then be applied in a variety of ways within the vehicle system such as a) activating a warning light to the driver to have the vehicle examined, b) deactivating various connectivity modes that would potentially allow an attacker to gain remote access to the vehicle, or c) switching the vehicle to a pre-designed "safe" mode that disables various automated driving functions that might allow an attacker to gain control (e.g., such as terminating autonomous driving, turning off the vehicle, severing internet access, etc.). For further understanding, described below in greater detail are the two time-series extractors 300 and 302 and concluding with the correspondence analyzer 304.

(4.1) Data Bus Time Series Extractor

For a variety of vehicles, including cars, trucks, motorcycles, snowmobiles, trains, buses, airplanes, as well as vehicles for agriculture, construction, mining, and marine, the standard data bus for exchanging state information between system components is the CAN bus. Other vehicles may potentially use other types of data busses, but the principle behind the Data Bus Time Series Extractor 300 would be similar. The data bus carries messages that are transmitted from one module to another within the vehicle system. A majority of these messages contain status information about the state of various vehicle subsystems. The role of the Data Bus Time Series Extractor 300 is to convert these status messages into a time series of system states.

Figure 4:
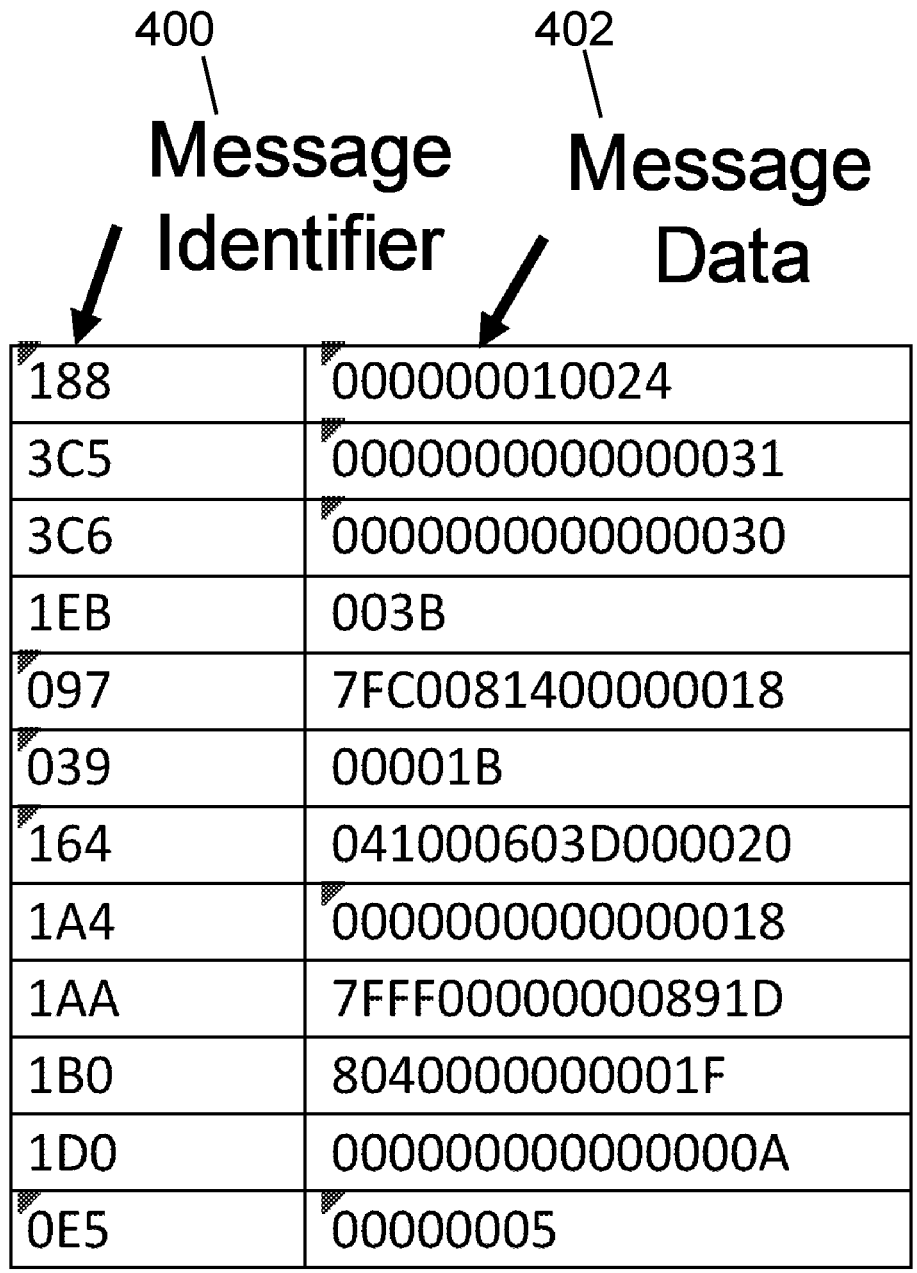
FIG. 4 is an illustration depicting an example of a short sequence of CAN bus messages showing typical message structure.

The CAN bus provides reliable high-speed communication between multiple modules. It is noted that the specifics of time-series extraction may vary for other bus networks that have different characteristics, but those skilled in the art can readily adapt the methods of the present disclosure to these other busses. In the CAN bus, messages are broadcast from each module to all other system modules over a common bus-line. As shown in FIG. 4, each message sent includes an 11-bit identifier field 400 and a variable-length data field 402. Other fields are also present, but these are not relevant to the present discussion. The important aspect of CAN messages is that they are not addressed to a specific destination. Instead, any number of modules may receive a given CAN message and the interpretation of the message data field is then determined according to the identifier field. In practice, multiple modules are active on the CAN bus simultaneously, and bus arbitration rules are used to ensure that whenever two modules attempt to communicate simultaneously, only one message will prevail. It will then be up to the other module to re-transmit its message. As a result, messages with state information are generally transmitted on a periodic basis from each module, but the update period for different message types will vary depending on system design and message priority requirements. Also, as a result of bus arbitration, the actual repetition rate of any given message is not guaranteed to be exact, and variability in repetition rates can be seen.

Figure 5:
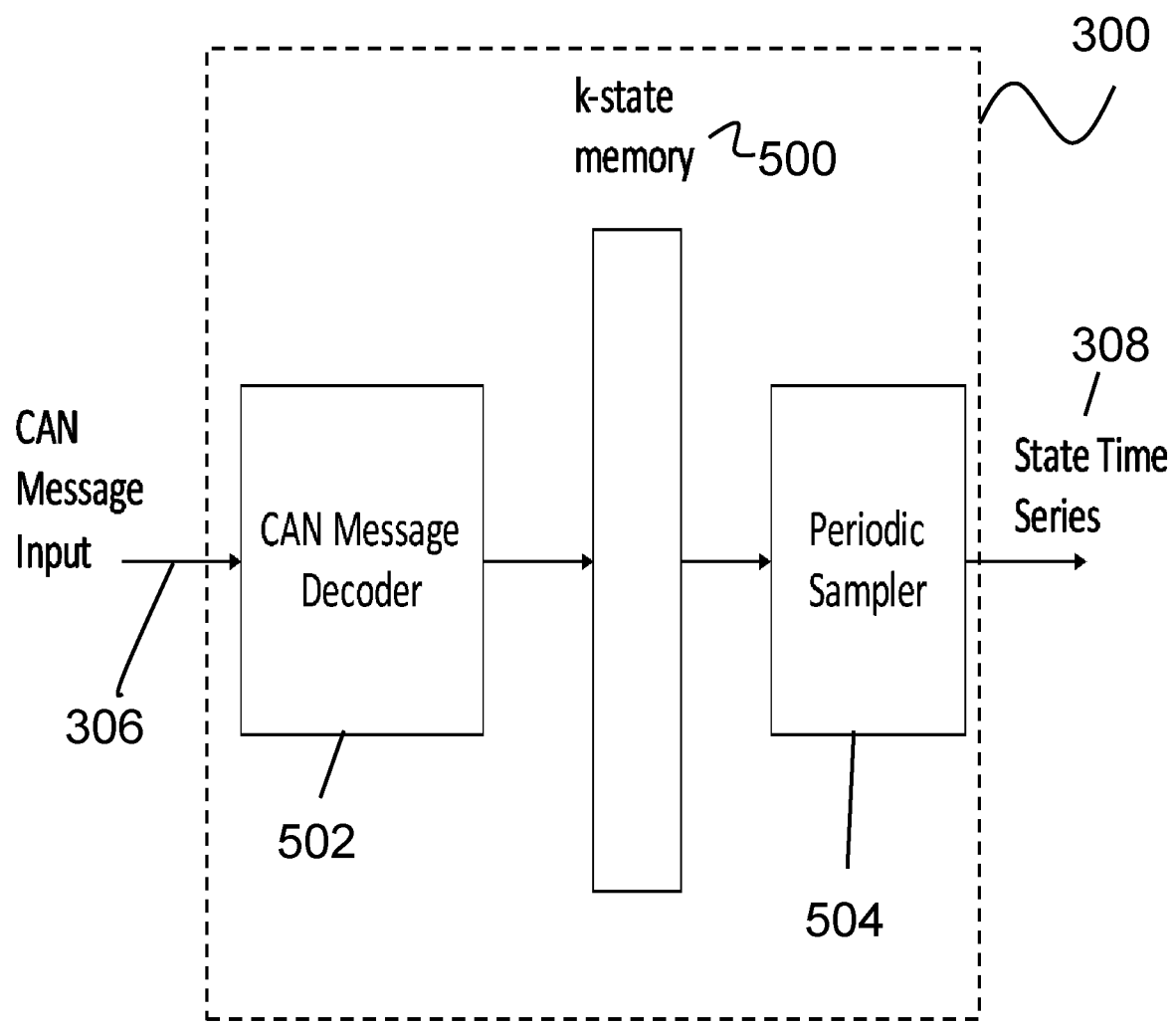
FIG. 5 is an illustration of a Data Bus Time Series Extractor according to various embodiments of the present invention.

Given this variability in message timing, the role of the Data Bus Time Series Extractor 300 is to convert the message contents of these messages into a k-dimensional time series of system state variables that has a constant time interval between state updates. As shown in FIG. 5, the Data Bus Time Series Extractor 300 performs the conversion using a k-state memory 500 that stores k state variables. When a message 306 arrives on the CAN Bus, the CAN Message Decoder 502 reads the message contents and updates a subset of the k state variables that correspond to the state variables defined in the message. In a separate thread, the Periodic Sampler 504 reads all the variables within the k-state memory 500 and outputs, at regular periodic intervals, the entire contents of the k-state memory 500 as the time series of system states 308. Each CAN bus message contains only a small subset of variables contained in the k-state memory. These are updated in the memory by the CAN Message Decoder 502 whenever a message is received. Meanwhile, the Periodic Sampler 504 reads the entire k-state memory 500 at regular time intervals. Thus, some variables may be updated by the Decoder 502 many times between these time intervals while other variables may not be updated between each interval. Despite these variations in update, the Periodic Sampler 504 always takes the most recent value of all variables when it samples the memory.

This process effectively converts the asynchronous and non-deterministic state updates from the CAN bus into a regularly sampled sequence of state variables (i.e., time series of system states 308) that can be used to match against states obtained from the side-channel analysis.

(4.2) Side-Channel State Time Series Extractor

Figure 6:
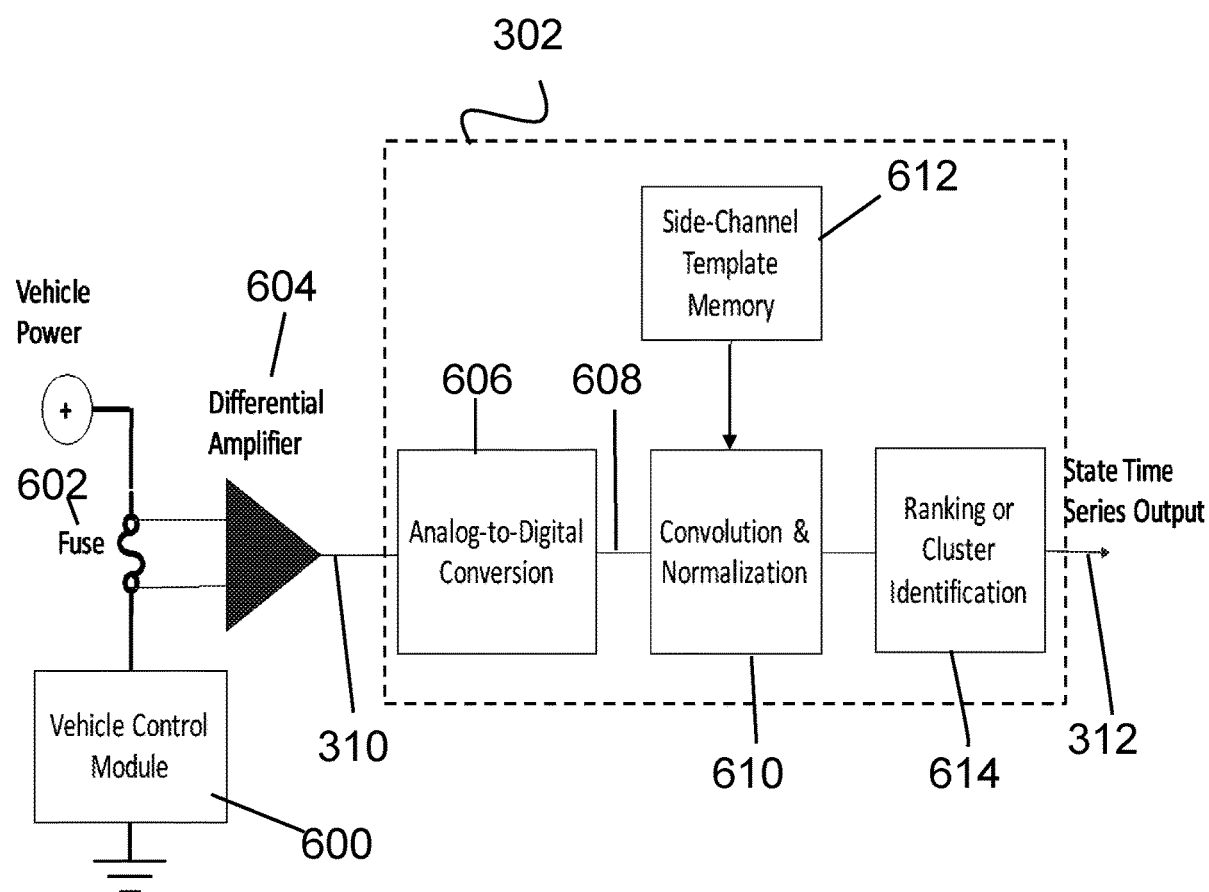
FIG. 6 is an illustration of a Side-Channel State Time Series Extractor according to various embodiments of the present invention.

To obtain a second source of state time series, the system uses analog side-channel signals obtained from fluctuations in power consumption of vehicle system components. An example embodiment of this method using such a Side Channel State Time Series Extractor 302 is shown in FIG. 6. Here, power consumption of a vehicle control module 600 is monitored by sensing the voltage fluctuations across a standard fuse 602 used in the vehicle for the subsystem of interest. Because the fuse 602 imposes a small resistance, the changes in voltage across this resistance are indicative of fluctuations in power consumption by the connected subsystem. To sense these fluctuations, a differential amplifier 604 is used across the two terminals of the fuse 602 (or other component as applicable to the particular system) to obtain a resulting time-varying voltage (i.e., analog side-channel signals 310) at the output of the amplifier 604. This analog signal 310 is then converted 606 to a digital signal 608 that is processed to obtain a time-varying state of the sensed module (i.e., time-series of system states 312). Analog to digital conversion 606 can be performed using any suitable analog-to-digital (A/D) converter, a non-limiting example of which includes the TLC549CP chip as created by Texas Instruments, located at 12500 TI Boulevard Dallas, Tex. 75243 USA.

It should be noted that there are numerous other methods to obtain a side-channel signal, such as by using a loop antenna to pick up radio-frequency emissions, or an acoustic sensor to monitor vibrations. The present invention works regardless of the particular means of signal acquisition, although the described example embodiment was found to be quite robust to statistical fluctuations in the input signal (i.e., signal noise).

Figure 7:
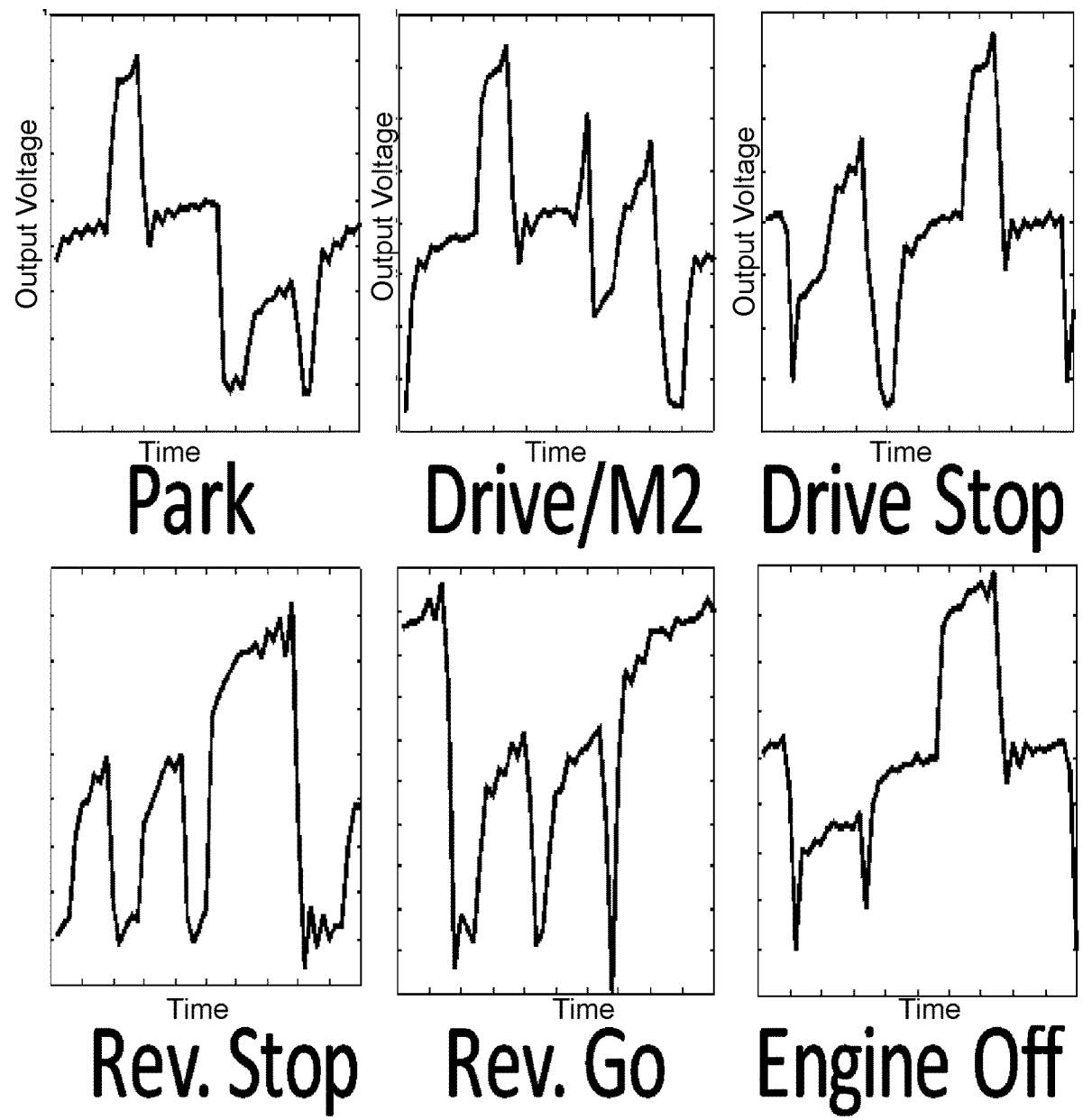
FIG. 7 is an illustration of examples of several side-channel templates contained in a template memory where each template characterizes the expected signal corresponding to a different state of a vehicle transmission.

The convolution and normalization stage 610 is a central part of the conversion of the digitized side-channel signals 608 into identifiable system states. The system begins with a collection of side-channel templates of length L, stored in a side-channel template memory 612. In various embodiments, these templates may be obtained from previous sampling of the side-channel signal during various known states; the templates may also be taken from single samples or from multiple samples that are aligned and then averaged together, or any combination of such techniques. FIG. 7, for example, depicts examples of such templates obtained from a vehicle transmission module, where each template characterizes the expected signal corresponding to a different state of a vehicle transmission. FIG. 7 depicts analog waveforms, with the vertical axis representing output voltage from the differential amplifier and time on the horizontal axis at about $2.27 \times 10^{-5}$ seconds per unit.

Each of these templates is pre-normalized using the following normalization procedure based on using the root-mean-square of the template signal:
1. Square each sample of the template;
2. Sum these squared samples; and
3. Divide each sample of the template by the square root of this sum.

When an incoming side-channel signal is obtained, a normalizing signal NORM is created for this signal using the following steps:
1. Square each sample of the signal;
2. Convolve this squared signal with a template of L samples each of value 1; and
3. Take the square root of each sample of this convolved result to obtain the signal NORM.

The system then performs the following steps for each normalized template:
1. Create a new signal CONV(i) obtained by convolving the time-reversed normalized template (i) with the incoming signal;
2. Divide each sample of CONV(i) with corresponding samples of NORM; and
3. Scan the result for the maximum value within each block of M samples where M is greater than or equal to L. Call this result MAX(i)

Referring again to FIG. 6, the ranking or cluster identification step 614 is performed once the system has obtained MAX(i) for each template (i). Any suitable ranking or clustering identification process can be employed and programed into the system to obtain a sequence of states (i.e., the time-series of system states 312), two-non-limiting examples of which are provided below.

Figure 8:
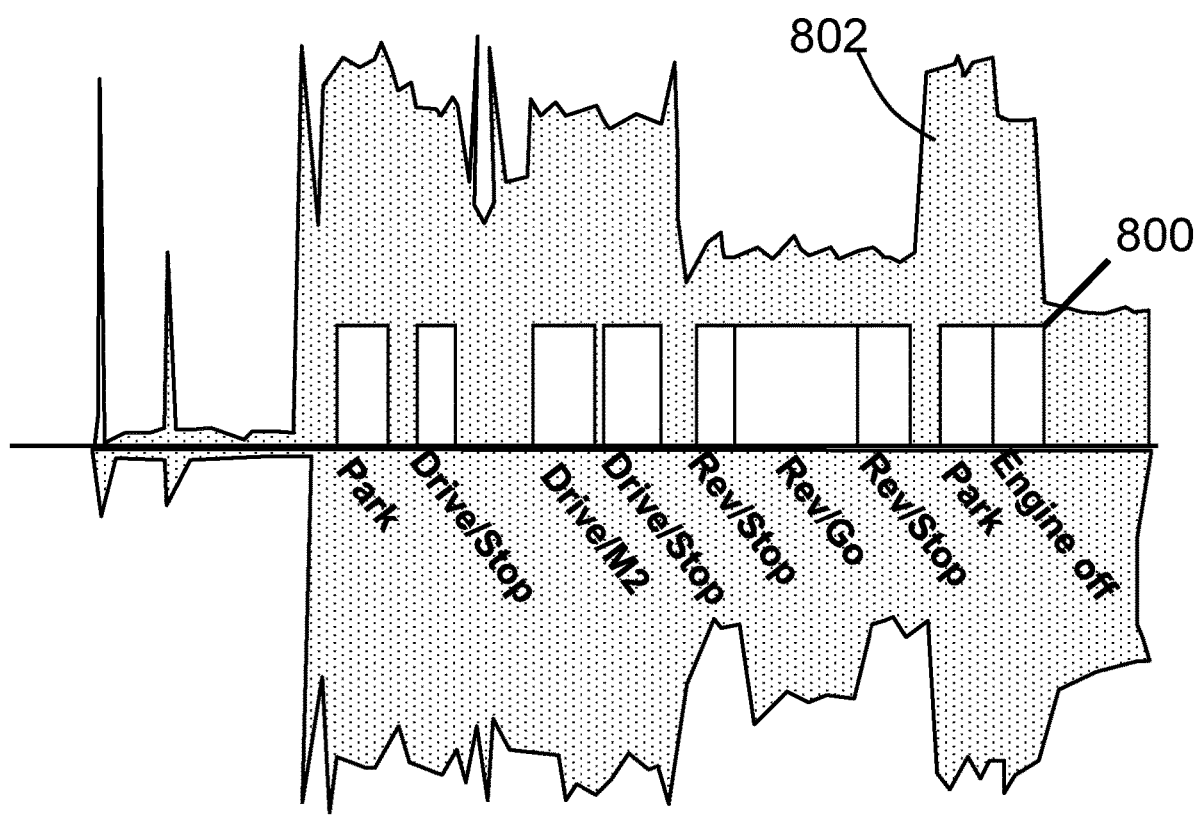
FIG. 8 is an illustration of an example time series showing the sequence of matched templates corresponding to different vehicle states, with the original side-channel signal shown in the background.

The first method is to simply compare the values MAX(i) over all templates (i) and find the template (i) that has the largest MAX(i) value at each time interval. This (i) value can then be identified as the state at the given point in time where it was maximum. The sequence of such (i) values becomes the time-series 312. An example of the state time-series 312 output result is shown in FIG. 8. For example, FIG. 8 depicts an example time series showing the sequence of matched templates 800 corresponding to different vehicle states, with the original side-channel signal 802 shown in the background. At points where no template matches well, there is no label.

A second option is to use the i-dimensional time-series of MAX(i) values to assign states according to a distance metric obtained from k-means clustering. In this scheme, there will be k states defined by k centroids, and the identified state at any given time will be the index of the centroid that is the least distance to the i-dimensional MAX vector at that time. In this example, the time series 312 is made up of a series of these centroid indices.

(4.3) State Correspondence Analyzer

A third aspect of the system is to provide a process to analyze the time series 308 and 312 generated from the CAN bus and the side-channel signals to identify anomalies which are designated as being indicative of a cyber-attack. Here, the problem is that there is not always a solid one-to-one correspondence between states found in the CAN bus messages and states obtained from side-channels. Instead, it is noted that there several many-to-one and many-to-many relationships that are possible. There are also cases where a transition occurs first in a CAN bus state that is later followed by a related change in the side-channel state. Likewise, there are occasions where the opposite also occurs. To deal with this, each CAN bus state is mapped to a set of all states that are allowable in the side-channel signal when those states are active. Each side-channel state is also mapped to all states that are allowable in the CAN bus when those states are active. An example of this is shown in the table depicted in FIG. 10. In this example, there are 40 side-channel states along the horizontal axis and four CAN bus states along the vertical axis. Using the mappings described above, the system can identify any box in this chart that has a zero entry as a condition of CAN bus and side-channel states that should never be observed at the same time.

Further, the system identifies the allowable state transitions that are possible between CAN bus states under the condition that a certain side-channel state is active and vice versa for side-channel state transitions under the condition that certain CAN Bus states are active. For example, and as shown in the table, there are many possible side-channel states that can exist during the CAN bus drive-go states. While any of these states are allowed, the system can generate a transition matrix for side-channel states that identifies which transitions are likely to occur and which are not. In the example matrix or table as shown in FIG. 10, the top labels indicate the determined state based on the data as presented in the table. Specifically, DG denotes Drive/Go, P denotes Park, RG denotes Reverse/Go, DS denotes Reverse/Stop, and UN denotes undecided. For those transitions that may never occur, the system can generate an alert condition (e.g., audible or visible alert) that an anomaly has occurred.

Together, the conditions that disallow the co-occurrence of certain side-channel states with certain CAN bus states combined with the conditions that disallow certain temporal sequences of side-channel states while a given CAN bus state is present form a set of constraints that must not be violated as the two time series 308 and 312 are observed. Thus, any violation of these constraints is deemed abnormal or anomalous behavior and becomes a robust condition for signaling an alarm. As such, in identifying violations of predetermined constraints, sets of disallowed combinations of side-channel states and data bus states are identified, and any co-occurrences of these disallowed combinations appearing simultaneously and repeatedly within the first time series of system states and the second time series of system states is classified as a cyber-attack of the platform. Therefore, any violation of these constraints is designated as a cyber-attack which causes the system to initiate further actions as appropriate. The discussion of possible actions that might be initiated are described in further detail below.

(4.4) Control of a Device.

Figure 9:
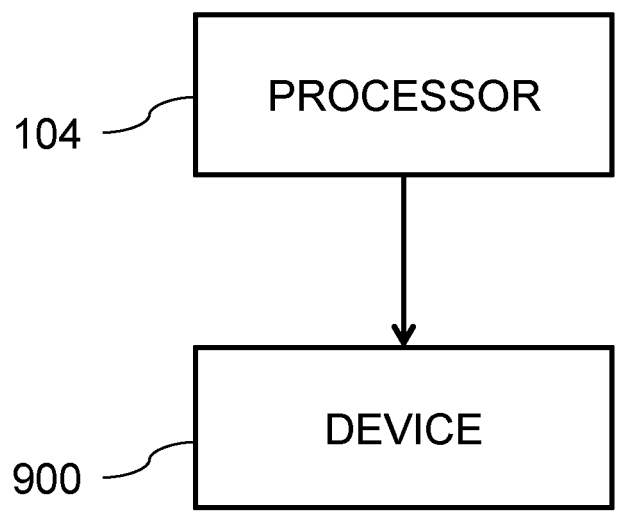
FIG. 9 is a block diagram depicting control of a device according to various embodiments.

As shown in FIG. 9, the processor 104 may be used to initiate an action to control a device 900 (e.g., a vehicle or vehicle subsystem, a motor, a machine, a drone, a camera, etc.) based on identifying a constraint violation that is designated as a cyber-attack detection. For example, the device 900 may be controlled to cause the device to move or otherwise initiate an action based on the detection.

As noted above, a warning signal can be generated and provided to a system operator. Other example actions include deactivating various connectivity modes or severing internet network connections (electronically or physically with actuator-controlled gates) to modules that were deemed to be corrupted or otherwise operating in an abnormal matter. Additional examples include switching the vehicle to a pre-designed "safe" mode that disables various vehicular functions, such transmission functions or automated driving functions. For example, one or more autonomous piloting or driving functions can be terminated to force the driver to physically retake control of the vehicle. As another example, the vehicle can be caused to safely cease moving and then turn off. In this example, if an automobile, the automobile can be caused to brake and slowly steer off of a roadway and, upon stopping, cut power to the engine and other systems. As can be appreciated, there are several other automatic actions that can be initiated based on detection of such a cyber-attack. Other non-limiting examples of such actions include warnings and alerts, cutting off certain optional functions, switching out of various high-risk control modes, switching to alternate secure software modules (that may lack some functionality but have higher security).

Finally, while this invention has been described in terms of several embodiments, one of ordinary skill in the art will readily recognize that the invention may have other applications in other environments. It should be noted that many embodiments and implementations are possible. Further, the following claims are in no way intended to limit the scope of the present invention to the specific embodiments described above. In addition, any recitation of "means for" is intended to evoke a means-plus-function reading of an element and a claim, whereas, any elements that do not specifically use the recitation "means for", are not intended to be read as means-plus-function elements, even if the claim otherwise includes the word "means". Further, while particular method steps have been recited in a particular order, the method steps may occur in any desired order and fall within the scope of the present invention.

What is claimed is:

1. A system for side-channel based detection of cyber-attack, the system comprising:
one or more processors and a memory, the memory being a non-transitory computer-readable medium having executable instructions encoded thereon, such that upon execution of the instructions, the one or more processors perform operations of:
converting data bus signals from a platform into a first time series of system states;
converting analog side-channel signals from the platform into a second time-series of system states by performing operations of capturing an analog side-channel signal; converting the analog side-channel signal into a digital representation; normalizing and convolving the digital representation of the analog side-channel signal with at least one stored template representing expected patterns for different system states; selecting a best matching template for the digital representation; and outputting at periodic intervals an identification of the best matching template;
detecting anomalous behavior of the platform by comparing the first time series of system states with the second time series of system states to identify violations of predetermined constraints, the anomalous behavior being designated as a cyber-attack of the platform; and
causing the platform to initiate an action based on the cyber-attack.

2. The system as set forth in claim 1, wherein said action comprises at least one of deactivating internet network connections and switching the platform into a safe mode to disable one or more functions.

3. The system as set forth in claim 1, wherein the data bus is a vehicle CAN bus.

4. The system as set forth in claim 1, wherein said anomalous behavior is further detected by identifying:
violations of predetermined constraints,
sets of disallowed combinations of side-channel states and data bus states, and
co-occurrences of disallowed combinations appearing simultaneously and repeatedly within the first time series of system states and the second time series of system states.

5. The system as set forth in claim 4, wherein detecting said anomalous behavior further comprises identifying allowable state transitions between data bus states and corresponding side-channel states as predetermined constraints, and wherein the processor further performs the operations of observing violations of the predetermined constraints in the first time series of system states and the second time series of system states.

6. The system as set forth in claim 1, wherein said converting data bus signals from a platform into a first time series of system states further comprises operations of:
maintaining a k-state memory with the values of state variables transmitted by messages over the data bus such that all values in the memory represent the most recently received values over the data bus; and
outputting at periodic intervals all of the k-state variables in the k-state memory as the first time series of system states.

7. The system as set forth in claim 1, wherein capturing the analog side-channel signal comprises amplifying a voltage measured across a sub-component fuse.

8. The system as set forth in claim 1, wherein the analog side-channel signal is captured by a radio-frequency receiver.

9. A computer program product for side-channel based detection of cyber-attack, the computer program product comprising:
a non-transitory computer-readable medium having executable instructions encoded thereon, such that upon execution of the instructions by one or more processors, the one or more processors perform operations of:
converting data bus signals from a platform into a first time series of system states;
converting analog side-channel signals from the platform into a second time-series of system states by performing operations of capturing an analog side-channel signal; converting the analog side-channel signal into a digital representation; normalizing and convolving the digital representation of the analog side-channel signal with at least one stored template representing expected patterns for different system states; selecting a best matching template for the digital representation; and outputting at periodic intervals an identification of the best matching template;

detecting anomalous behavior of the platform by comparing the first time series of system states with the second time series of system states to identify violations of predetermined constraints, the anomalous behavior being designated as a cyber-attack of the platform; and causing the platform to initiate an action based on the cyber-attack.

10. The computer program product as set forth in claim 9, wherein said action comprises at least one of deactivating internet network connections and switching the platform into a safe mode to disable one or more functions.

11. The computer program product as set forth in claim 9, wherein the data bus is a vehicle CAN bus.

12. The computer program product as set forth in claim 9, wherein said anomalous behavior is further detected by identifying:
- violations of predetermined constraints,
- sets of disallowed combinations of side-channel states and data bus states, and
- co-occurrences of disallowed combinations appearing simultaneously and repeatedly within the first time series of system states and the second time series of system states.

13. The computer program product as set forth in claim 12, wherein detecting said anomalous behavior further comprises identifying allowable state transitions between data bus states and corresponding side-channel states as predetermined constraints, and wherein the processor further performs the operations of observing violations of the predetermined constraints in the first time series of system states and the second time series of system states.

14. The computer program product as set forth in claim 9, wherein said converting data bus signals from a platform into a first time series of system states further comprises operations of:
- maintaining a k-state memory with the values of state variables transmitted by messages over the data bus such that all values in the memory represent the most recently received values over the data bus; and
- outputting at periodic intervals all of the k-state variables in the k-state memory as the first time series of system states.

15. The computer program product as set forth in claim 9, wherein capturing the analog side-channel signal comprises amplifying a voltage measured across a sub-component fuse.

16. The computer program product as set forth in claim 9, wherein the analog side-channel signal is captured by a radio-frequency receiver.

17. A computer implemented method for side-channel based detection of cyber-attack, the method comprising an act of:
- causing one or more processors to execute instructions encoded on a non-transitory computer-readable medium, such that upon execution, the one or more processors perform operations of:
  converting data bus signals from a platform into a first time series of system states;
  converting analog side-channel signals from the platform into a second time-series of system states by performing operations of capturing an analog side-channel signal; converting the analog side-channel signal into a digital representation; normalizing and convolving the digital representation of the analog side-channel signal with at least one stored template representing expected patterns for different system states; selecting a best matching template for the digital representation; and outputting at periodic intervals an identification of the best matching template;
  detecting anomalous behavior of the platform by comparing the first time series of system states with the second time series of system states to identify violations of predetermined constraints, the anomalous behavior being designated as a cyber-attack of the platform; and
  causing the platform to initiate an action based on the cyber-attack.

18. The method as set forth in claim 17, wherein said action comprises at least one of deactivating internet network connections and switching the platform into a safe mode to disable one or more functions.

19. The method as set forth in claim 17, wherein the data bus is a vehicle CAN bus.

20. The method as set forth in claim 17, wherein said anomalous behavior is further detected by identifying:
- violations of predetermined constraints,
- sets of disallowed combinations of side-channel states and data bus states, and
- co-occurrences of disallowed combinations appearing simultaneously and repeatedly within the first time series of system states and the second time series of system states.

21. The method as set forth in claim 20, wherein detecting said anomalous behavior further comprises identifying allowable state transitions between data bus states and corresponding side-channel states as predetermined constraints, and wherein the processor further performs the operations of observing violations of the predetermined constraints in the first time series of system states and the second time series of system states.

22. The method as set forth in claim 17, wherein said converting data bus signals from a platform into a first time series of system states further comprises operations of:
- maintaining a k-state memory with the values of state variables transmitted by messages over the data bus such that all values in the memory represent the most recently received values over the data bus; and
- outputting at periodic intervals all of the k-state variables in the k-state memory as the first time series of system states.

23. The method as set forth in claim 17, wherein capturing the analog side-channel signal comprises amplifying a voltage measured across a sub-component fuse.

24. The method as set forth in claim 17, wherein the analog side-channel signal is captured by a radio-frequency receiver.

* * * * *